United States Patent
McKinnell et al.

(10) Patent No.: US 7,570,417 B2
(45) Date of Patent: **\*Aug. 4, 2009**

(54) MICRO-ELECTRO MECHANICAL LIGHT MODULATOR DEVICE

(75) Inventors: James McKinnell, Salem, OR (US); Arthur R. Piehl, Corvallis, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/874,840

(22) Filed: Oct. 18, 2007

(65) Prior Publication Data

US 2008/0037099 A1     Feb. 14, 2008

Related U.S. Application Data

(62) Division of application No. 11/150,562, filed on Jun. 9, 2005, now Pat. No. 7,319,552.

(51) Int. Cl.
    *G02B 26/00* (2006.01)
(52) U.S. Cl. ........................ 359/291; 359/290
(58) Field of Classification Search ............... 359/223, 359/224, 290, 291, 259, 261, 263
    See application file for complete search history.

(56) References Cited

U.S. PATENT DOCUMENTS

| | | |
|---|---|---|
| 4,603,507 A | 8/1986 | Nelson |
| 6,031,653 A | 2/2000 | Wang |
| 6,611,366 B2 | 8/2003 | Islam et al. |
| 6,704,079 B2 * | 3/2004 | Minoura et al. ............. 349/113 |
| 6,744,335 B2 | 6/2004 | Ryhanen |
| 7,064,883 B2 | 6/2006 | Payne |
| 7,123,216 B1 * | 10/2006 | Miles ........................ 345/54 |
| 7,319,552 B2 * | 1/2008 | McKinnell et al. .......... 359/291 |
| 2002/0054424 A1 | 5/2002 | Miles |
| 2004/0240032 A1 | 12/2004 | Miles |
| 2005/0046919 A1 | 3/2005 | Taguchi et al. |
| 2006/0056004 A1 * | 3/2006 | Jilani et al. ................. 359/291 |

\* cited by examiner

*Primary Examiner*—Timothy J Thompson

(57) ABSTRACT

A micro-electro mechanical light modulator device includes a movable reflective plate, a fixed partial reflective plate, an optical gap defined between the reflective plate and the fixed plate, and an actuator configured to move the reflective plate through an operating range wherein a neutral state position of the reflective plate approximately corresponds to a black state value of the optical gap.

7 Claims, 6 Drawing Sheets

MICRO-ELECTRO MECHANICAL LIGHT MODULATOR DEVICE

This application is a divisional of Ser. No. 11/150,562, filed Jun. 9, 2005, now U.S. Pat. No. 7,319,552, which is hereby incorporated by reference.

BACKGROUND

Micro-electromechanical systems (MEMS) are used in a variety of applications such as optical display systems. Such MEMS devices have been developed using a variety of approaches. In one approach, a deformable deflective membrane is positioned over an electrode and is electrostatically attracted to the electrode. The gap between the two electrodes determines the output of the device. Accordingly, the output of the device is controlled by controlling the gap distance.

One approach for controlling the gap distance between electrodes is to apply a continuous control voltage to the electrodes, wherein the control voltage is increased to decrease the gap distance, and vice-versa. In such approaches the gap distance changes as charge accumulates on the electrodes, creating an electrostatic force therebetweeen. This electrostatic force is opposed by a mechanical restoring force provided by the deflection of flexures that supports one of the electrodes. This approach suffers from electrostatic instability that greatly reduces a usable operating range over which the gap distance can be effectively controlled. This is because the electrodes form a variable capacitor in which capacitance increases as the gap distance decreases.

When the gap distance is reduced to a certain threshold value, usually about two-thirds of an initial gap distance, the electrostatic force of attraction between the electrodes overcomes the mechanical restoring force causing the electrodes to "snap" together or to mechanical stops. This is because at a distance less than the minimum threshold value, the capacitance is increased to a point where excess charges are drawn on the electrodes resulting in increased electrostatic attraction. This phenomenon is known as "charge runaway."

As introduced, the electrodes are sometimes snapped to mechanical stops. The size of the optical gap when the electrodes are in contact with the mechanical stops often corresponds to the black state size of the optical gap, such that when the electrodes are in this position, the device absorbs light incident thereon. This mechanical contact may result in the electrodes sticking together (or stiction). Further, this electrical contact may also result in spot welding. Accordingly, the contact may reduce the reliability and/or operating life of a device and consequently the display system that makes use of such a device.

SUMMARY

A micro-electro mechanical light modulator device includes a movable reflective plate, a fixed partial reflective plate, an optical gap defined between the reflective plate and the fixed plate, and an actuator configured to move the reflective plate through an operating range wherein a neutral state position of the reflective plate approximately corresponds to a black state value of the optical gap.

BRIEF DESCRIPTION OF THE DRAWINGS

The accompanying drawings illustrate various embodiments of the present apparatus and method and are a part of the specification. The illustrated embodiments are merely examples of the present apparatus and method and do not limit the scope of the disclosure.

Throughout the drawings, identical reference numbers designate similar, but not necessarily identical, elements.

DETAILED DESCRIPTION

Several exemplary light modulator devices are described herein that may improve the reliability of a display system by providing non-contact operation. Non-contact operation refers to minimizing or eliminating contact between individual parts or components of the light modulator device, such as a reflective plate. Non-contact operation minimizes stiction or spot welding associated with contact between individual components or parts of the light modulator device. According to several exemplary embodiments, an optical gap and an electrical gap are separated to provide non-contact operation.

The sizes of the optical gap and electrical gap are varied by adjusting the position of a reflective plate. Several different support structures may be used to support the reflective plate as it moves through its operational displacement range. Further, according to several exemplary embodiments, the neutral position of the reflective plate approximately corresponds to the black state position of the light modulator device. In some of such embodiments, the position of the reflective plate is controlled by electrostatic forces. Other embodiments make use of piezo-electric actuators or magnetically controlled actuators to control the position of the reflective plate.

The operational displacement range refers to the distance the reflective plate travels between a black state position and the position of the reflective plate corresponding to the maximum optical gap.

In the following description, for purposes of explanation, numerous specific details are set forth in order to provide a thorough understanding of the present method and apparatus. It will be apparent, however, to one skilled in the art, that the present method and apparatus may be practiced without these specific details. Reference in the specification to "one embodiment" or "an embodiment" means that a particular feature, structure, or characteristic described in connection with the embodiment is included in at least one embodiment. The appearance of the phrase "in one embodiment" in various places in the specification are not necessarily all referring to the same embodiment.

Display Systems

Figure 1:
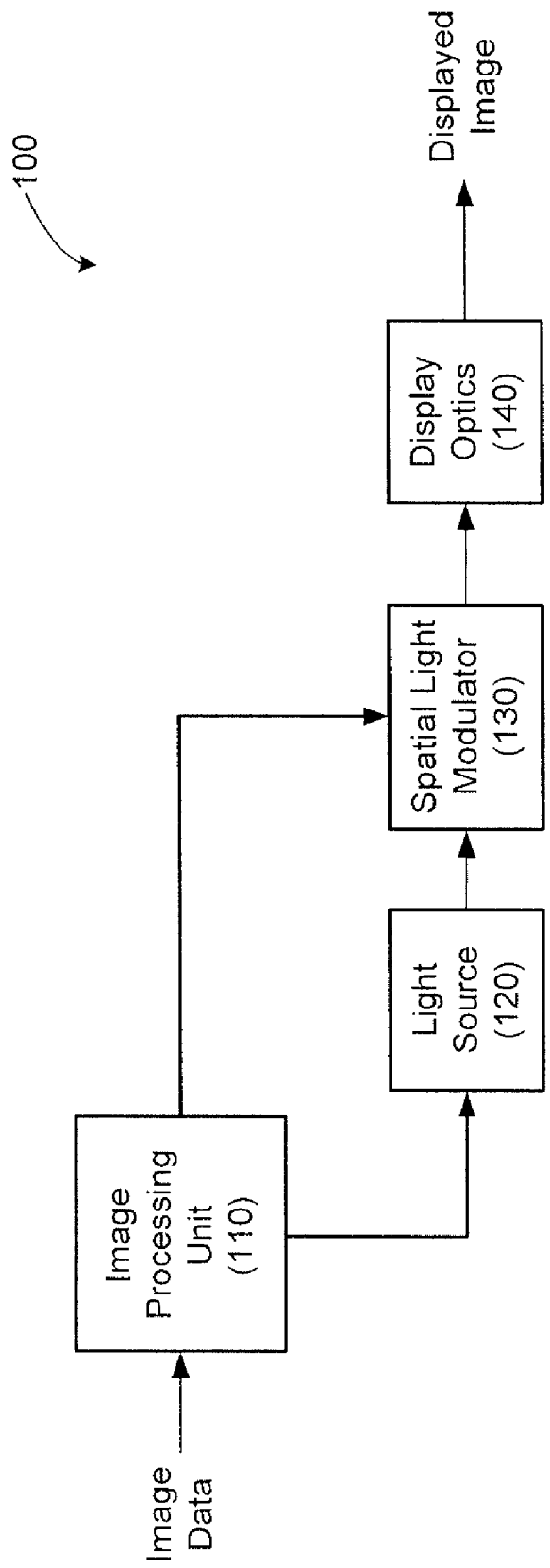
FIG. 1 illustrates an exemplary display system.

FIG. 1 illustrates an exemplary display system (100). The components of FIG. 1 are exemplary only and may be modified or changed as best serves a particular application. As shown in FIG. 1, image data is input into an image processing unit (110). The image data defines an image that is to be displayed by the display system (100). While one image is illustrated and described as being processed by the image processing unit (110), it will be understood by one skilled in the art that a plurality or series of images may be processed by the image processing unit (110). The image processing unit (110) performs various functions including controlling the illumination of a light source (120) and controlling a spatial light modulator (SLM) (130). The SLM (130) will now be discussed in more detail.

The SLM (130) includes an array of micro-electro mechanical (MEM) devices, or light modulator devices, which have optical cavities defined therein. Each optical cavity has an optical gap formed between two opposing reflectors. The size of the gap is controlled by balancing a spring force and an electrostatic force between the two reflectors. Light that enters each light modulator device is modulated or manipulated to achieve desired characteristics. These characteristics, which include the hues and intensities of the transmitted light, are manipulated by varying the gap between the reflectors.

Returning to the operation of the display system (100) in general, the SLM (130) manipulates incoming light to form an image-bearing beam of light that is eventually displayed or cast by display optics (140) on a viewing surface (not shown). The display optics (140) may comprise any device configured to display or project an image. For example, the display optics (140) may be, but are not limited to, a lens configured to project and focus an image onto a viewing surface. The viewing surface may be, but is not limited to, a screen, television, wall, liquid crystal display (LCD), or computer monitor. The light modulator device structures described herein allow the size of the reflectors to be precisely controlled while minimizing or eliminating undesired contact between the two reflectors and/or other parts of the light modulator device. This control also includes the control of the black state of the light modulator device.

Non-Contact Mode Micro-Electro Mechanical

Figure 2A:
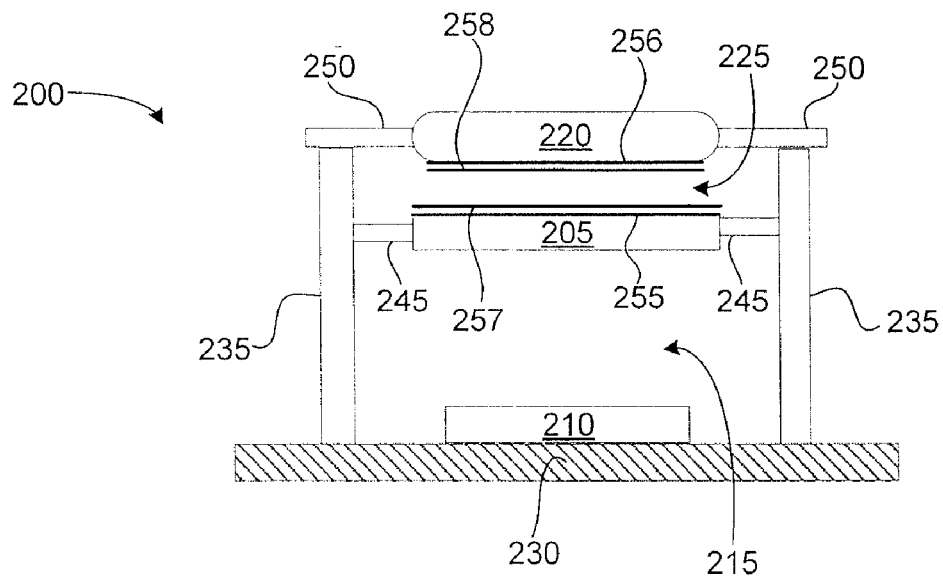
FIG. 2A illustrates an exemplary light modulator device in a neutral position state position.
Figure 2B:
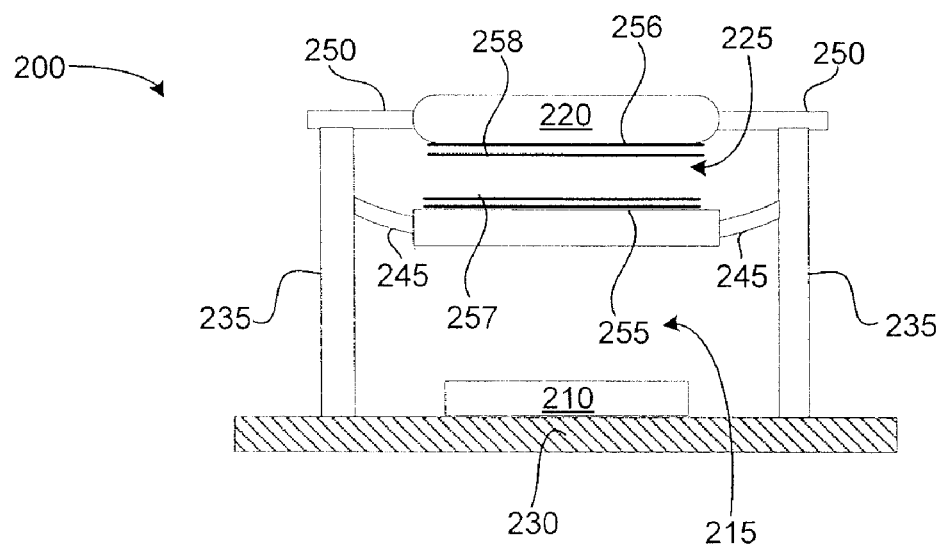
FIG. 2B illustrates the light modulator device of FIG. 2A in which the reflective plate is at an intermediate position within the operational displacement range of the reflective plate.
Figure 2C:
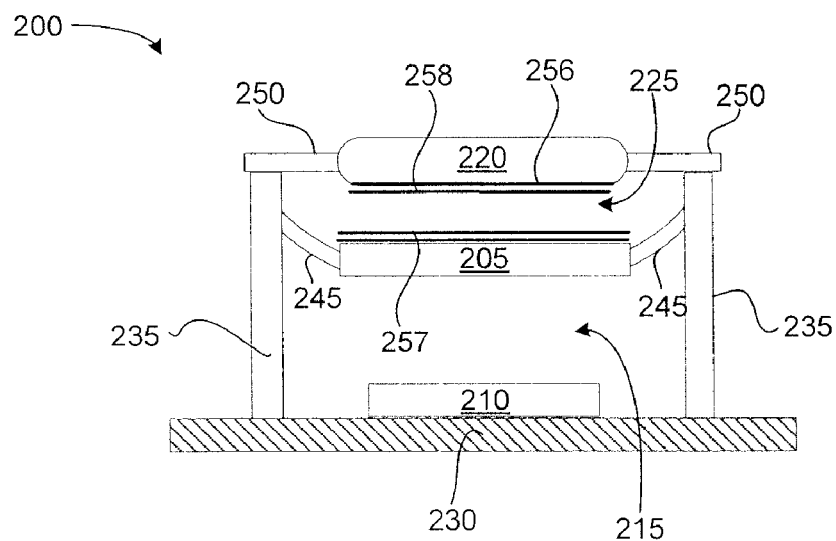
FIG. 2C illustrates the light modulator device of FIGS. 2A-2B in which the reflective plate is at an extreme position of the operational displacement range of the reflective plate.

FIGS. 2A-2C illustrates the operation of a single light modulator device or light modulator device (200). The light modulator device (200) includes a reflective plate (205) and a fixed electrode plate (210) separated by a non-optical gap, such as an electrical gap (215). The light modulator device (200) also includes a top plate (220) that is separated from the reflective plate (205) by an optical gap (225). Decreasing the size of the electrical gap (215) increases the size of the optical gap (225). As will be discussed in more detail below, the light modulator device (200) is configured to allow the reflective plate (205) to move between a black state position and a maximum color displacement value while minimizing or eliminating contact between the reflective plate (205) and other parts of the light modulator device (200). The configuration of the light modulator device (200) will now be discussed in more detail.

The light modulator device (200) is supported by a substrate (230). For example, a support structure supports the reflective plate (205) and an outside support structure supports the top plate (220). In particular, the fixed electrode plate (210) is supported by the substrate (230). Posts (235) are also supported by the substrate (230). Flexures (245) are coupled to the posts (235) and support the reflective plate (205) above the substrate. Supports (250) are coupled to the posts (235) such that the supports (250) suspend the top plate (220) above the reflective plate (205). The flexures (245) may be any suitable flexible material, such as a polymer, a metal or single crystal silicon, that has linear or non-linear spring functionality. For example, the flexures (245) may be part of a pin-wheel type support structure, as will be discussed in more detail with reference to FIG. 3.

The light modulator device shown (200) functions as a Fabry-Perot light modulator. As a result, a portion of the top of reflective plate (205) is treated with a highly reflective coating (255) while a portion of the underside of the top plate (220) is treated with a partially reflective coating (256). A portion of a beam of light incident on the light modulator device (200) will pass through the top plate (220) and be partially reflected by the partially reflective coating (256) on the underside of the top plate (220) while another portion of the beam of light will pass through the top plate (220) and the partially reflective coating (256) and into the optical gap (225).

Once the light enters the optical gap (225), it is bounced between the partially reflective coating on the underside of the top plate (220) and the highly reflective coating on the reflective plate (205). Each time the light inside the optical gap (225) becomes incident on the partially reflective top plate (220), some portion of the light passes through the partially reflective coating and the top plate (220) and escapes the light modulator device (200). The wavelengths of the light that are thus able to pass through the top plate (220) depend at least in part on the size of the optical gap (225). Accordingly, varying the size of the optical gap (225) controls the characteristics of light that exits the light modulator device (200).

The size of the optical gap (225) is controlled by movement of the reflective plate (205). The optical gap (225) of the light modulator device (200) shown in FIGS. 2A-2C may be precisely controlled over a broad range of displacements, or an operating displacement range, while minimizing or eliminating contact between the reflective plate (205). This operational displacement range includes movement from a neutral position to produce a black state response through positions for producing light of selected wavelengths within the visible spectrum. The relative position of the reflective plate (205) and corresponding optical gap and the electrical gap will first be discussed with reference to a black state/neutral state position, followed by a discussion of intermediate displacement positions and the extreme displacement positions.

FIG. 2A shows the light modulator device (200) in a neutral state position. A neutral state position refers to the relative position of each of the light modulator device's components in the absence of a force applied to the reflective plate (205). The neutral state position of the light modulator device (200) may correspond to the black state position of the reflective plate (205). In particular, as shown in FIG. 2A, the flexures (245) are not substantially deflected in response to electrostatic force between the reflective plate (205) and the fixed electrode plate (210). In particular, the reflective plate (210) and the top plate (220) are coupled to the same reference voltage. As a result, the light modulator device (200) is in its neutral state when no electrostatic force is established between the reflective plate (205) and the top plate (220) and the fixed electrode plate (210) and the reflective plate (205) have little or no electrostatic force between them.

The optical gap (225) in this configuration is at its minimum size. More specifically, the optical gap (225), may be between about 50-200 nm, or approximately 100 nm, which allows the light modulator device (200) to absorb sufficient light to be in a black state. For example, the size of the optical gap (225) while the reflective plate (205) is in a black state position allows the light modulator device (200) to trap essentially all of the light that enters therein, such that the light modulator device produces black output. Accordingly, the light modulator device (200) may be reliably placed in its black state while minimizing or eliminating the need for the use of bumps, posts, or other protrusions to maintain the proper gap distance. The black state position thus introduced may be considered as a default black state gap. This gap can be adjusted by controlling the size of the optical gap (225).

As previously introduced, controlling the size of the optical gap (225) controls the output of the light modulator device (200). Accordingly, in addition to establishing the neutral state position of the reflective plate (205) to correspond with the black state response of the light modulator device (200), the neutral state position may cause the optical gap (225) at a neutral state position to be smaller than at the black state response. In such a case, the black state response may then be controlled by controlling the electrostatic force between the reflective plate (205) and the fixed electrode plate (210). Further, as previously discussed, the size of the optical gap (225) shown in FIGS. 2A-2C depends, at least in part, on the size of the electrical gap (215). These relative positions will now be discussed in more detail.

Establishing electrical charge on the plates (205, 210) varies the optical gap (225), such that a desired wavelength at a desired intensity may be selected. The flexures (245) allow the electrical gap (215) to vary when charge is stored on the plates (205, 210). The charge stored on the plates (205, 210) results in an electrostatic force between the plates (205, 210), thereby drawing the reflective plate (205) toward the fixed electrode plate (210). This force is opposed by the spring force associated with the deflection of the flexures (245). When an electrostatic force exists between the plates (205, 210), the reflective plate (205) will continue to be drawn toward the fixed electrode plate (210) until the spring force and the electrostatic force reach equilibrium. When these two forces reach equilibrium, the reflective plate (205) will be held in this position. One possible intermediate position of the reflective plate (205) is shown in FIG. 2B. Accordingly, the relative position of the reflective plate (205) with respect to the fixed electrode plate (210) and the top plate (220) may be varied by the amount of charge applied to the plates (205, 210). Once the electrostatic force is released, such as by dissipating the accumulated charges, the spring force returns the flexures (245) to a neutral state position. While the present exemplary embodiment has been discussed with reference to establishing an electrostatic force between the plates, those of skill in the art will appreciate that an electric field may be established between the plates such that the size of the electric gap is controlled with bias.

As previously introduced, the reflective plate (205) is moved about a range of positions to control the output of the light modulator device (200) in response to control signals from the image processing unit (110; FIG. 1). FIG. 2C illustrates the reflective plate (205) near one extreme of its range of motion. As shown in FIG. 2C, at this position, the instantaneous electrical gap (215) is substantially more than ⅔ the size of the electrical gap when the reflective plate (205) is in the neutral state location shown in FIG. 2A. As a result, the electrical gap (215) at the neutral position is approximately three times as large as the operational displacement range of the reflective plate (205). Accordingly, the reflective plate (205) moves through a range of motion while maintaining an electrical gap (215) that is above the minimum threshold to prevent the reflective plate (205) from snapping to the electrode plate (210) when the reflective plate (205) is controlled by bias control.

As a result, the light modulator device (200) is able to provide both black state responses and normal operating state responses while minimizing or eliminating contact between the reflective plate (205) and other parts of the light modulator device (200). In addition, the top surface of the reflective plate (205) and the bottom surface of top plate (220), which are adjacent the optical gap (225), may be coated with dielectric materials. These surfaces may be coated with a layer of protective material (255), such as a layer of dielectric material, because the optical gap (225) and the electrical gap (215) are separated. More specifically, the bottom surface of the reflective plate (205) and the top surface of the fixed electrode plate (210) are adjacent the electrical gap (215). Consequently, these surfaces are the surfaces that have electrostatic charge accumulated thereon to provide the electrostatic forces discussed above.

The top surface of the conductive plate (205) and the bottom surface of top plate (220) in the exemplary embodiment shown in FIGS. 2A-2C do not accumulate charges and therefore may be coated with protective layers (257, 258). The protective layers (257, 258) may be useful in protecting the top plate (220) and/or the reflective plate (205) during formation and/or use of the light modulator device (200). The protective layers (257, 258) are shown separated from the highly reflective coating (255) and the partially reflective coating (256) to emphasize that multiple layers may be applied.

According to other exemplary embodiments, the top plate (220) is coupled to a voltage source that may be different than the voltage source coupled to the reflective plate (205). In such an embodiment, the neutral state position of the reflective plate (205) may be adjusted by establishing a potential between the reflective plate (205) and the top plate (220). Accordingly, the voltage difference between the reflective plate (205) and the top plate (220) may be used to fine tune the black state response of the light modulator device (200).

Accordingly, the configuration of the present light modulator device (200) allows the light modulator device (200) to modulate light, including black state display, while minimizing or eliminating contact between the reflective plate (205) and other parts of the light modulator device (200). Minimizing or eliminating contact between components minimizes stiction or other adverse affects, which may decrease the reliability and operating life of the light modulator device (200). As previously introduced, the flexures (245) allow the reflective plate (205) to move, thereby varying the size of the electrical gap (215) and the optical gap (225). Several support structures may be employed to allow this movement, including a pinwheel type support structure, which is shown in more detail in FIG. 3.

Pinwheel Flexure Structure

Figure 3:
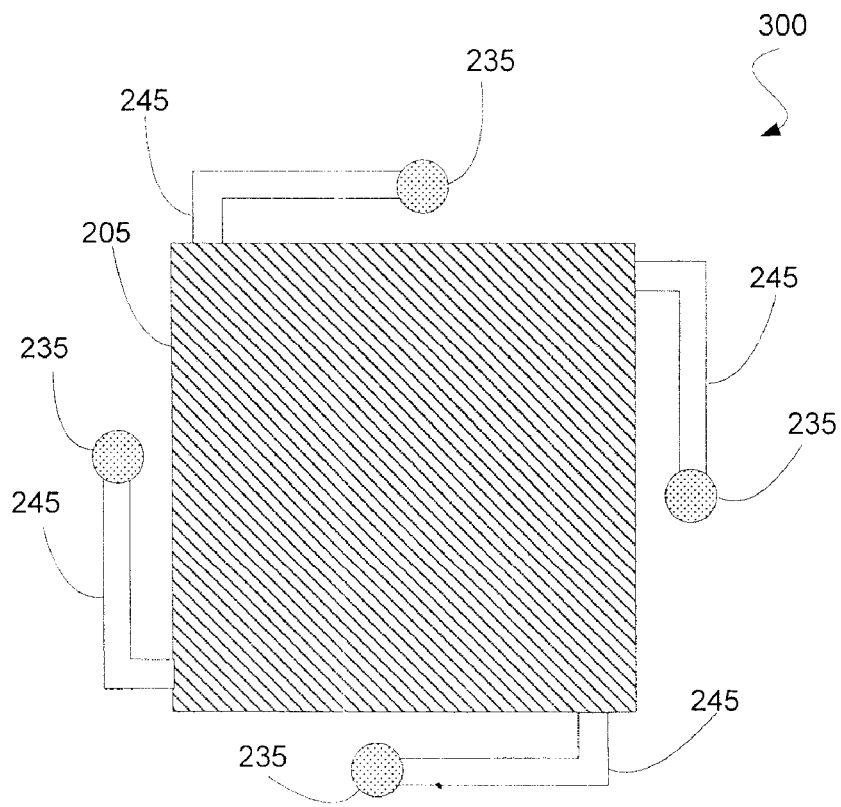
FIG. 3 illustrates a top view of the light modulator device of FIGS. 2A-2C showing the pinwheel support structure in more detail.

FIG. 3 illustrates a top partial cutaway side view respectively of a light modulator device (200) incorporating a pinwheel flexure structure (300). In particular, the supports (250) and the top plate (220) have been cutaway to focus on the pinwheel flexure structure (300). The reflective plate (205) is suspended over the fixed electrode plate (210; FIGS. 2A-2C) by the posts (235) which extend from the substrate (230; FIGS. 2A-2C) in a pinwheel configuration. In this configuration, the flexures (245) extend from the posts (235) to the corners of the reflective plate (205) to thereby suspend the reflective plate (205).

As an electrostatic force is established between the reflective plate (205) and the fixed electrode plate (210), the flexures (245) deflect in response to the force, thereby allowing control of the size of the optical gap (225) as discussed above. While a pinwheel cantilever or torsional-type flexure structure (300) has been discussed above, any number of support structures may be used. Some other exemplary support structures include, without limitation, cantilever type support structures, torsional type support structures, and other suitable support structures may be used in place of the pinwheel type support structure discussed herein to provide a non-contact operating mode and black state control. The formation of an exemplary light modulator device that provides such properties will now be discussed.

Method of Forming Non-Contact Mode Light Modulator Device

Figure 4:
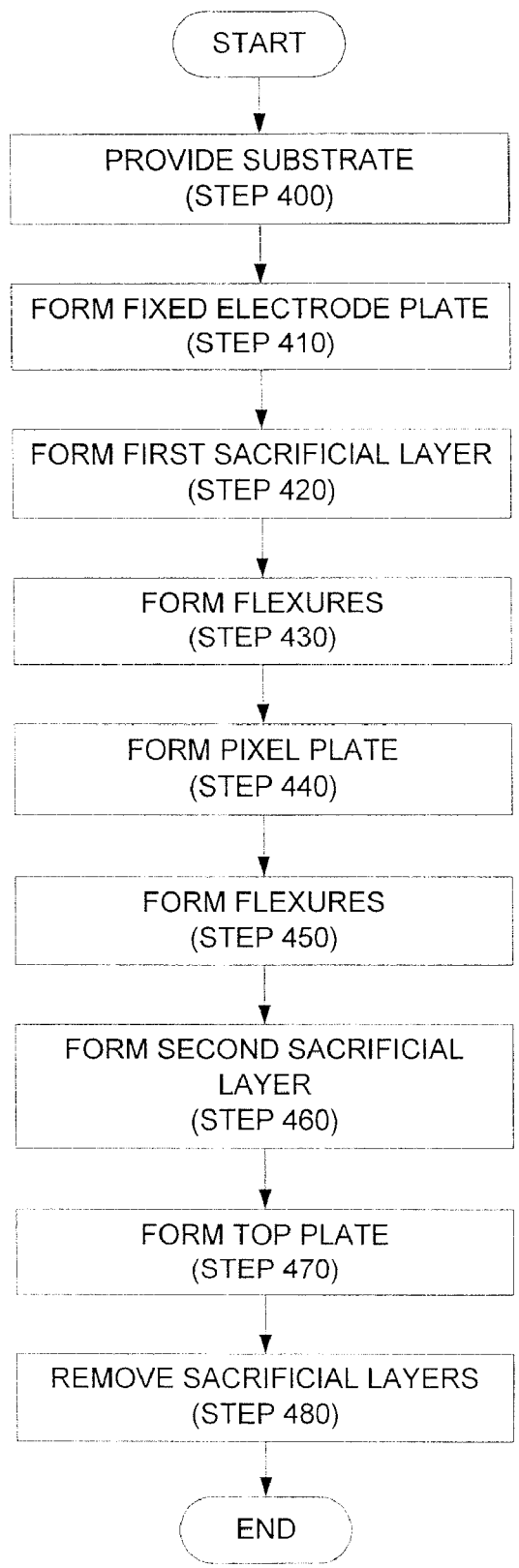
FIG. 4 is a flowchart illustrating an exemplary method of forming a light modulator device.

FIG. 4 illustrates a method of forming a non-contact mode light modulator device. The method begins by providing a substrate (step 400). The substrate serves as a base or foundation for the light modulator device. In particular embodiments, the substrate may be formed as part of a larger member or wafer serving as a foundation for a plurality of light modulator devices and may be made of silicon.

Thereafter, the fixed electrode plate is formed on the substrate (step 410). The electrode plate may be formed by depositing a layer of conductive material. The layer of conductive material is then processed. This processing may include applying a bottom charge plate photoresist pattern and etching through the exposed areas. As the bottom charge plate layer is etched, the bottom fixed electrode plate is established on the substrate.

A first sacrificial layer is then formed on the bottom electrode plate layer (step 420). One exemplary first sacrificial layer includes a 200 angstroms layer of silicon nitrate (SiN) and a layer of amorphous-Silicon (a-Silicon). The layer of a-Silicon may range in thickness from about 1000-7000 angstroms. According to one exemplary embodiment, the a-Silicon layer is approximately 3300 angstroms thick. The first sacrificial layer is then processed to form flexure vias that extend through first sacrificial layer to the substrate. These flexure vias correspond in shape to the bottom portion of the posts (235; FIGS. 2A-2B).

The flexures are then formed (step 430) by depositing a layer of flexure material, applying a flexure photoresist pattern, and etching through the first sacrificial layer. The resulting flexures are thus formed on top of the first sacrificial layer.

The reflective plate is then formed (step 440). The reflective plate layer is deposited on the flexures, thereby coupling the flexures to the reflective plate. The reflective plate layer then has a photoresist pattern applied thereto and etched to establish the reflective plate and remove material from the flexure vias.

Once the reflective plate has been formed, a second sacrificial layer (450) is formed on the reflective plate layer. Thereafter, the posts are formed (step 460). The posts are formed by first applying a post via photoresist pattern to the second sacrificial layer. The post via photoresist pattern includes exposed areas above the flexure vias. These exposed areas are then etched, such that post vias are formed that extend to the bottom of the flexure vias previously formed. A layer of post material is then deposited in the post vias. Thereafter, a post formation photoresist pattern is applied to the layer of post material. The post photoresist pattern positively covers the post vias. Thereafter, the exposed layer of post material is etched through to the remaining second sacrificial layer, which may range in thickness from about 500-3000 angstroms.

The partially reflective top plate is then formed (step 470) on the second sacrificial layer and posts. Once this structure has been formed, the first sacrificial layer, the flexure space sacrificial layer (625), and the second sacrificial layer (635) may be removed (step 480), thereby establishing the electrostatic gap, the flexure space, and the optical gaps discussed above.

The resulting light modulator device includes a reflective plate movably supported by flexures. The movement of the reflective plate in response to an electrostatic force controls the size of the electrical gap and the optical gap. This control is accomplished while minimizing or eliminating contact between the reflective plate and other parts of the light modulator device.

Piezo-Electric and Magnetically Actuated Flexures

Figure 5:
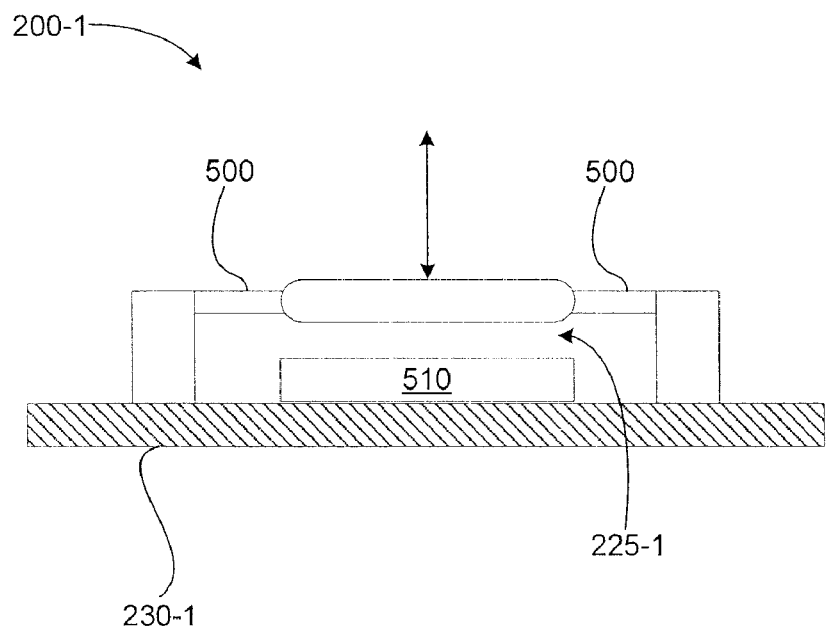
FIG. 5 illustrates an exemplary light modulator device that includes piezo-electrically actuated flexures.

In addition, other actuation mechanisms may be used in place of electrostatic attraction. For example, FIG. 5 illustrates a light modulator device (200-1) that includes piezo-electrically actuated flexures (500). The light modulator device (200-1) generally includes a reflective plate (230-1) that is separated from a fixed mirror (510) by an optical gap (225-1). When the reflective plate (230-1) is in its neutral position, the optical gap (225-1) approximately corresponds to the black state gap of the light modulator device (200-1). The optical gap (225-1) is then controlled by selectively controlling the piezo-electric flexures.

The piezo-electrically actuated flexures (500) are coupled to a power source (not shown), which selectively provides voltage thereto. The flexures (500) expand in response to the applied voltage, thereby causing the reflective plate (230-1) to move away from the fixed mirror (510), thereby enlarging the optical gap (225-1). As previously discussed, controlling the size of the optical gap (225-1) controls the characteristics of light output by the light modulator device (200-1). Accordingly, these light output characteristics, including black state, may be controlled while minimizing or eliminating contact between the reflective plate (230-1) and other parts of the light modulator device (200-1).

Figure 6:
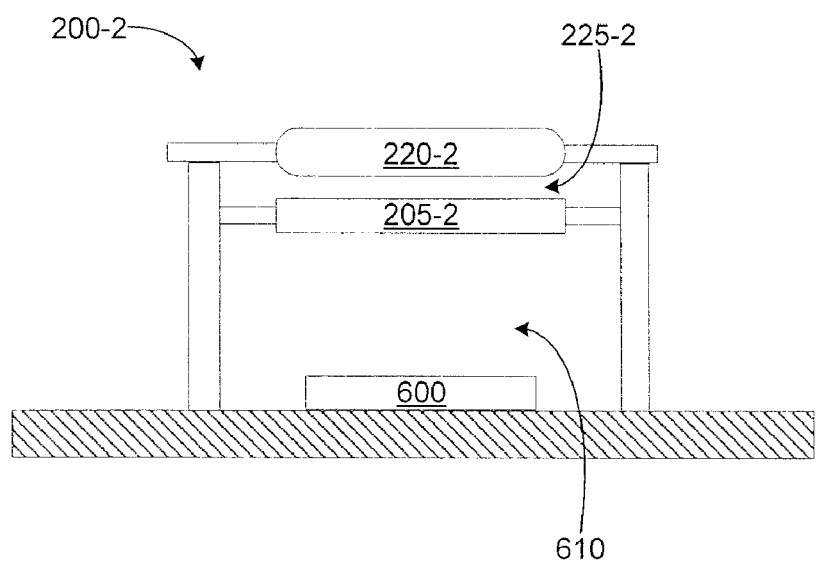
FIG. 6 illustrates an exemplary light modulator device that includes a magnetically controlled reflective plate.

In addition, magnetic control may also be used to provide black state and other color outputs from a light modulator device. As shown in FIG. 6, a light modulator device (200-2) is shown that includes a magnetic reflective plate (205-2) and a fixed magnetic plate (600) separated by a magnetic gap (610). The magnetic reflective plate (205-2) is shown in a neutral position in which field symmetry exists between the magnetic reflective plate (205-2) and the fixed magnetic plate (600). In this position, the magnetic reflective plate (205-2) is separated from the top plate (220-2) by an optical gap (225-2). This configuration allows the light modulator device to produce a black state response while minimizing or eliminating the contact between the magnetic reflective plate (205-2) and other parts of the light modulator device.

The magnetic reflective plate (205-2) is drawn toward the fixed magnetic plate (500) by increasing the magnetic B field strength of magnetic plate (600) thereby increasing the field gradient between the two plates. The magnetic B field strength is varied by changing the magnetic H field applied to a fixed magnetic plate by changing the current in an electromagnet coil (not shown) that surrounds the fixed magnetic plate. As the magnetic reflective plate (205-2) is drawn toward the fixed magnetic plate (600), the optical gap (225-2) is varied, thereby effecting modulation of light that enters the light modulator device (200-2). Accordingly, the light output characteristics of the light modulator device (200-2), including black state, may be controlled while minimizing or eliminating contact between the magnetic reflective plate (220-2) and other parts of the light modulator device (200-2). Accordingly, several different actuation mechanisms may be used to operate in non-contact modes to provide color responses, including black state responses.

In conclusion, several exemplary light modulator devices are described herein that may improve the reliability of a display system by providing non-contact operation. Non-contact operation refers to minimizing or eliminating contact between individual parts or components of the light modulator device, such as a reflective plate. Non-contact operation minimizes stiction or spot welding associated with contact between individual components or parts of the light modulator device. According to several exemplary embodiments, an optical gap and an electrical gap are separated to provide non-contact operation.

The sizes of the optical gap and electrical gap are varied by varying the position of a reflective plate. Several different support structures may be used to support the reflective plate as it moves through its operating range. Further, according to several exemplary embodiments, the neutral position of the reflective plate approximately corresponds to the black state position of the light modulator device. In some of such embodiments, the position of the reflective plate is controlled by electrostatic forces. Other embodiments make use of piezo-electric actuators or magnetically controlled actuators to control the position of the reflective plate.

Alternative Embodiments

Other embodiments are possible that establish a black state response while maintaining non-contact operation of the components of the light modulator device. One of these exemplary embodiments will now be discussed.

Figure 7:
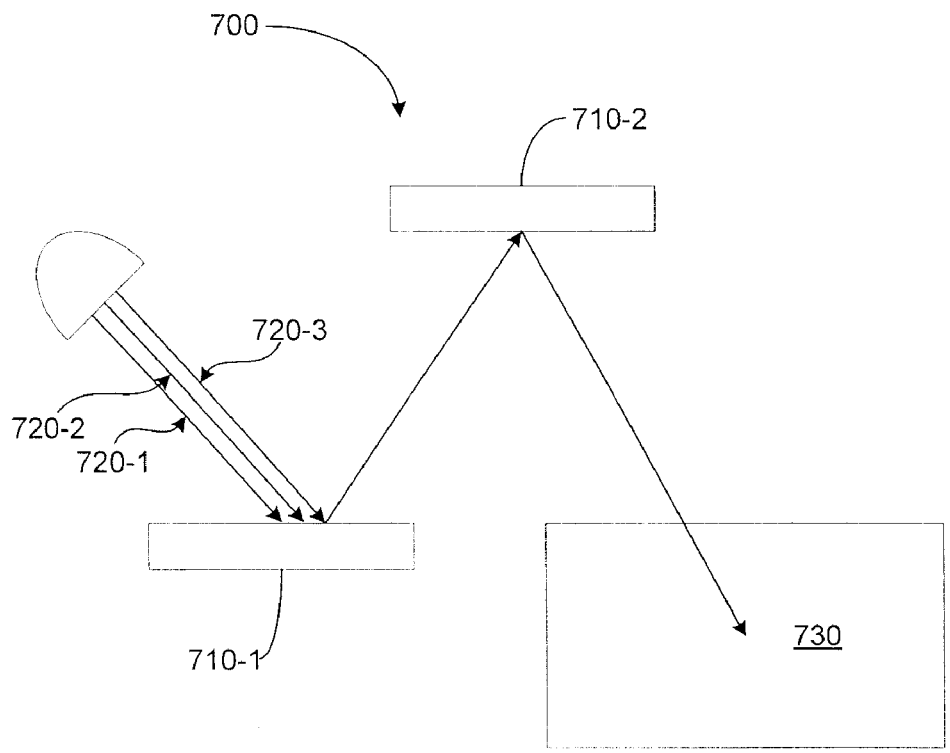
FIG. 7 illustrates a schematic view of a display system according to one exemplary embodiment.

FIG. 7 illustrates a schematic view of display system (700) in which first and second light modulator devices (710-1, 710-2) are placed in series. In such a system, white light, which includes red, green, and blue components (720-1, 720-2, 720-3) is directed to the first light modulator device (710-1). In providing a black state response, the first light modulator device (710-1) may be operated to provide an optical gap of approximately 3800 angstroms, which corresponds to the transmission of the blue component (720-3) and an absorption of a substantial portion of the red and green components (720-1, 720-2) of the incoming white light. The blue component is then directed to the second light modulator device (710-2) which may be operated to establish a gap of approximately 3000 angstroms. In such a case, the blue component would be absorbed by the device, such that a black state response would be detected on a display (730).

During periods of non-black state response, the gaps of first light modulator device (720-1) and the second light modulator device (710-2), are controlled to the same optical gap spacing to provide color response to the display (730). Accordingly, the present display system (700) provides for black state responses while reducing or eliminating contact between components of the individual light modulator devices.

Figure 8:
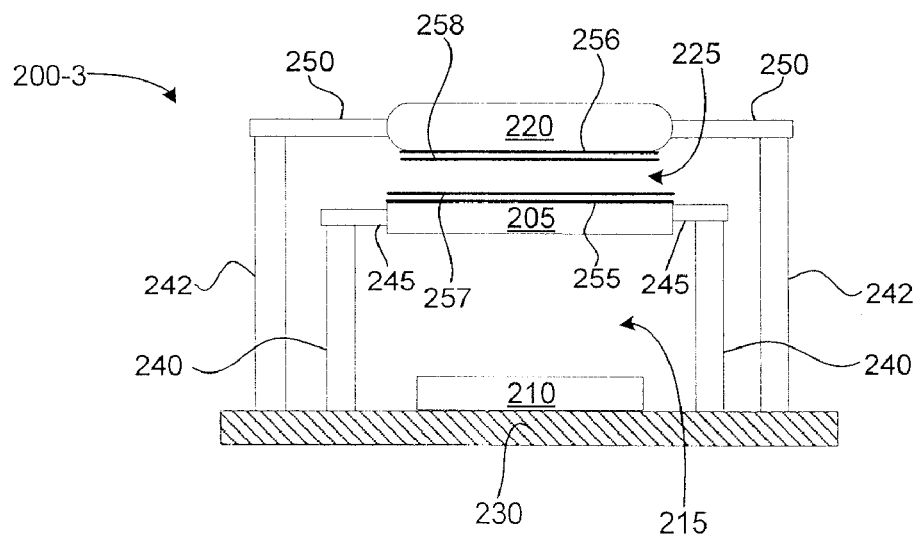
FIG. 8 illustrates a light modulator device according to one exemplary embodiment.

Further, to this point single posts have been described. Those of skill in the art will appreciate that separate posts may be used to support the top plate (220) and the reflective plate (205). In particular, FIG. 8 illustrates a light modulator device (200-3) in which inner posts (240) are used to support the reflective plate (205) while outer posts (242) are used to support the top plate (220).

The preceding description has been presented only to illustrate and describe the present method and apparatus. It is not intended to be exhaustive or to limit the disclosure to any precise form disclosed. Many modifications and variations are possible in light of the above teaching. It is intended that the scope of the disclosure be defined by the following claims.

What is claimed is:

1. A projector assembly, comprising:
a light source configured to generate white light;
a first light modulator device in optical communication with said light source;
a second light modulator device in optical communication with said first light modulator device; wherein, during normal operation, said first light modulator device being configured to selectively absorb a first component of said white light and to direct a second component of said white light to said second light modulator device, said second light modulator device being configured to reflect said second component and during black operation, said first light modulator device being configured to selectively absorb said first component of said white light and to direct a second component of said white light to said second light modulator device, said second light modulator device being configured to selectively absorb a substantial portion of said second component, and wherein each of said light modulator devices include interference type light modulator devices.

2. The assembly of claim 1, wherein during black operation, said first component includes red and green light and said second component includes blue light.

3. The assembly of claim 1, wherein each of said light modulator devices further comprises piezo-electrically actuated flexures, said piezo-electrically actuated flexures being configured to move said plate through said operational displacement range in response to applied voltage.

4. The assembly of claim 1, wherein each of said light modulator devices further comprises a fixed magnetic plate and a top plate, wherein said plate comprises a magnetic plate, and wherein said fixed magnetic plate and said plate are separated by a magnetic gap and said magnetic plate and said top plate are separated by an optical plate such that said magnetic plate is drawn toward said fixed magnetic plate in response to opposing polarities established on said magnetic plate and said fixed magnetic plate.

5. The assembly of claim 4, wherein said fixed magnetic plate comprises a coil around a plate.

6. A light modulator device, comprising:
a reflective plate;
a fixed semi-reflective plate; and
non-contact operating means for moving said reflective plate through an operational control range without contacting said fixed semi-reflective plate, and wherein said light modulator device is an interference type light modulator device.

7. The light modulator device of claim 6, and further comprising means for establishing a non-contact black state position between said reflective plate and said fixed semi-reflective plate.

* * * * *